United States Patent [19]

Gallagher et al.

[11] 4,097,663
[45] Jun. 27, 1978

[54] LOW FUSION COPOLYMER COMPRISING VINYL CHLORIDE, VINYL ACETATE, AND BIS(HYDROCARBYL)VINYLPHOSPHONATE

[75] Inventors: Ruth E. Gallagher, Dobbs Ferry; Jagadish C. Goswami, New City, both of N.Y.

[73] Assignee: Stauffer Chemical Company, Westport, Conn.

[21] Appl. No.: 653,313

[22] Filed: Jan. 29, 1976

[51] Int. Cl.$^2$ .................. C08J 9/00; C08F 30/02; C08F 4/32
[52] U.S. Cl. .................. 526/278; 260/2.5 P; 260/29.6 T; 526/229
[58] Field of Search .................. 526/278; 260/29.6 T

[56] References Cited

U.S. PATENT DOCUMENTS

| 3,691,127 | 9/1972 | Kraft et al. .................. 260/29.6 T |
| 3,725,309 | 4/1973 | Kraft et al. .................. 526/278 |
| 3,983,294 | 9/1976 | Goswami .................. 526/278 |

*Primary Examiner*—Herbert J. Lilling
*Attorney, Agent, or Firm*—Richard P. Fennelly

[57] ABSTRACT

An emulsion copolymer resin which contains from about 75% to about 90% by weight vinyl chloride, from about 5% to about 15% vinyl acetate and from about 5% to about 15% of a bis(hydrocarbyl)vinylphosphonate, has a fusion temperature of from about 200° F. to about 300° F. and has utility as a low fusion resin in the formation of cellular polyvinyl chloride products.

5 Claims, No Drawings

LOW FUSION COPOLYMER COMPRISING VINYL CHLORIDE, VINYL ACETATE, AND BIS(HYDROCARBYL)VINYLPHOSPHONATE

Technical Description of the Invention

In copending U.S. Ser. No. 598,522 of J. C. Goswami it is proposed that cellular polyvinyl chloride products of good cell quality be made using a lower fusion temperature than conventionally employed by using selected blowing agents and an organic base or oxidizing agent activator in a plastisol having a fusion temperature of from about 200° F. to about 300° F. The low fusion copolymer of the present invention can be used in the invention that is set forth in the above mentioned application, which is incorporated herein by reference.

The copolymer resin of the present invention is an emulsion copolymer which contains moieties derived from about 75 to 90%, by weight, vinyl chloride, from about 5% to about 15%, by weight vinyl acetate and from about 5% to about 15% by weight of a bis(hydrocarbyl) vinylphosphonate of the formula

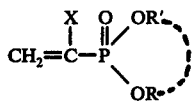

where X is selected from the group consisting of hydrogen, halogen, e.g., chlorine or bromine, cyano, aryl and $C_1$–$C_{18}$ alkyl. R and R' are hydrocarbyl groups obtained by removing a hydrogen from an aliphatic or aromatic group. Preferred groups for R and R' are the substituted and unsubstituted $C_1$–$C_{12}$ alkyl groups, particularly the halosubstituted $C_1$–$C_8$ alkyl groups. The substituents must not interefere with the emulsion polymerization reaction. A particularly preferred vinylphosphonate is bis(beta-chloroethyl) vinylphosphonate. A particularly preferred copolymer is formed by emulsion polymerizing from about 75% to about 90% by weight, vinyl chloride, from about 5% to about 15%, by weight, of vinyl acetate and from about 5% to about 15%, by weight of the vinylphosphonate, most preferably bis(-beta-chlorethyl) vinylphosphonate. The emulsion copolymer of this invention has a fusion temperature of from about 260° F. to about 300° F. and a relative viscosity of from about 1.6 to about 2.3 when measured as a 1% solution of the copolymer in cyclohexanone at 25° C.

The copolymer of the present invention is formed using conventional emulsion polymerization procedures which are well-known to persons of ordinary skill in the art.

Suitable water soluble, free radical initiating catalysts for use in preparing the copolymer latices of this invention include sodium, potassium and ammonium persulfate and hydrogen peroxide or one may use a redox system such, for example, as a mixture of a persulfate with an alkali metal bisulfite, thiosulfate or hydrosulfite. These catalysts should be present in a concentration of from 0.1 to 5%, by weight, of the total monomer charge. With respect to the emulsifier or surfactant, it is possible to utilize one or more anionic, cationic, or non-ionic emulsifiers such, for example, as the alkyl carboxylic acid salts; the alkyl sulfate, sulfonate, phosphate, or sulfosuccinate salts; the alkyl aryl ether alcohols, and the alkyl aryl polyether sulfate salts. The selected emulsifier or emulsifiers should be present in a total concentration of from about 0.3 to 8%, by weight, of the total monomer charge. In addition, a protective colloid such as polyvinyl alcohol, methyl cellulose or gelatin can also, if desired, be present in the recipe in a concentration of from about 0.05 to 5%, by weight, of the total monomer charge.

The actual polymerization reaction will ordinarily be conducted at a temperature of from about 30° to 80° C. for a period of from about 6 to 24 hours, depending upon such factors as the particular monomer, catalysts, surfactants and polymerization apparatus that is being utilized. The latices resulting from this polymerization process will ordinarily have a resin solids content of from about 20 to 50%, by weight, wherein the particles range in size from about 0.02 to 2 microns.

The Examples which follow illustrate certain preferred embodiments of the claimed invention.

EXAMPLE 1

This example illustrates the formation of the vinyl chloride-vinyl acetate-bis(beta-chloroethyl) vinylphosphonate emulsion copolymer of the present invention which is suitable for use in forming cellular polyvinyl chloride products. The procedure utilizes a sequence of polymerization steps. The monomer weight ratio in all steps is 80 parts vinyl chloride, 11 parts vinyl acetate and 9 parts bis (beta-chloroethyl) vinylphosphonate.

A portion of a deionized water charge of 38.5 lbs. was used to dissolve 38.3g of the bis (tridecyl) ester of sodium sulfosuccinic acid (sold as Aerosol-TR, American Cyanamid Co.), 19.5g of potassium persulfate, and 7.3g of sodium bicarbonate. The remainder of the water was added and the mixture was charged into the reactor. To this mixture was added 1 lb. 7¼ oz. of bis (beta-chloroethyl) vinylphosphonate and 1 lb. 12½ oz. of vinyl acetate. The reactor was closed, and the mixture was stirred briefly. The agitation was stopped and the reactor was evacuted three times with the vacuum being broken with vinyl chloride monomer. After the third evacuation, 12 lbs. 14 oz. of vinyl chloride monomer was charged into the mixture. The agitator was turned on, and the mixture was heated to 51° C. The reactor was held at this temperature for about six hours until a 40 lb./in$^2$ drop in pressure from the levels noted at the beginning of the reaction occurred. At this point, the reactor was vented and allowed to cool. The aqueous emulsion had a solids content of about 27% of the desired copolymer product which is called product "A".

A 7 lb. 2½ oz. portion of the product from the preceding step was used as a seed in another similar aqueous emulsion. The listing of the reagents which were used in this step is:

Vinyl Acetate : 1 lb. 8½ oz.
Vinyl Chloride : 11 lb. 3½ oz.
(beta-chloroethyl) vinylphosphonate : 1 lb. 4 oz.
Deionized Water : 31 lb. 15½ oz.
Aerosol TR-70 : 14.6 g.
Potassium persulfate : 14.6 g.
NaHCO$_3$ : 7.3 g.

The product from this step, called product "B", is a larger particle than was produced in the first polymerization step.

A similar portion of product "B" was used as a seed in another polymerization similar to the second polymerization set forth above. The aqueous emulsion which resulted therefrom contained Product "C".

A 3 lb. 9¼ oz. portion of product A and a 3 lb. 9¼ oz. portion of product C were used as a seed in a final polymerization procedure. The same reagents used in the second polymerization step above were again employed. The product from this step was used in Example 2.

EXAMPLE 2

This Example illustrates use of the copolymer resin of the present invention in the procedure claimed in copending U.S. Ser. No. 598,522.

A low fusion polyvinyl chloride resin composition was formed by admixing 100 parts by weight of the copolymer of Example 1, 100 parts by weight of a plasticizer composite comprising 80% butyl benzyl phthalate and 20% HB-40, a partially hydrogenated terphenyl plasticizer sold by Monsanto, 40 parts by weight of calcium carbonate filler, and 8 parts by weight of benzoyl peroxide paste. To this composition was added varying amounts of benzene sulfonyl hydrazide (Celogen BSH) and 4,4'-oxybis (benzene sulfonyl hydrazide) (Celogen OT). The compositions were expanded by heating to 260° F. (127° C.) for 10 minutes. The Table sets forth the results that were obtained:

TABLE 1

| FORMULATION | AMOUNTS (%) OF REAGENTS | | PEROXIDE PASTE | FOAM DENSITY (lbs/ft³) |
| | CELOGEN BSH | CELOGEN OT | | |
| --- | --- | --- | --- | --- |
| 1 | 5 | — | 3.33 | 25.6* |
| 2 | 3.33 | 1.67 | 3.33 | 25.7 |
| 3 | 2.5 | 2.5 | 3.33 | 25.4 |
| 4 | 1.67 | 3.33 | 3.33 | 25.6 |
| 5 | — | 5 | 3.33 | 31.1 |

All concentrations are expressed as weight % based on the weight of polyvinyl chloride copolymer, plasticizer composition and CaCO₃ filler.
*Malodorous foam.

When Celogen BSH was used at 5% with no peroxide paste and no Celogen OT, the malodorous foam had an unacceptable density of 53.8 lbs./ft.³. Use of Celogen OT alone with no peroxide paste yielded a composition which did not foam.

The foregoing illustrates certain preferred embodiments of the invention described herein. The scope of protection which is sought is set forth in the claims which follow.

What is claimed:

1. An emulsion copolymer having a fusion temperature of from about 200° F. to about 300° F. formed by emulsion polymerizing:
    a. from about 75% to about 90%, by weight, vinyl chloride;
    b. from about 5% to about 15%, by weight, vinyl acetate; and
    c. from about 5% to about 15% by weight of a bis(hydrocarbyl) vinylphosphonate of the formula

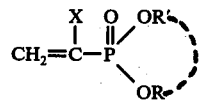

where X is selected from the group consisting of hydrogen, halogen, cyano, aryl and $C_1$–$C_{18}$ alkyl, and R and R' are unsubstituted and substituted $C_1$–$C_{12}$ alkyl groups.

2. A copolymer as claimed in claim 1 wherein X is chlorine or bromine.

3. A copolymer as claimed in claim 1 wherein R is a $C_1$–$C_{18}$ alkyl group.

4. A copolymer as claimed in claim 1 wherein the vinylphosphonate is bis(beta-chloroethyl) vinylphosphonate.

5. A copolymer as claimed in claim 1 in which the monomers being polymerized are (a) from about 75% to about 90%, by weight, vinyl chloride, (b) from about 5% to about 15%, by weight, vinyl acetate, and (c) from about 5% to about 15%, by weight, bis(beta-chloroethyl) vinylphosphonate.

* * * * *